United States Patent
Marti et al.

(10) Patent No.: US 11,841,986 B2
(45) Date of Patent: Dec. 12, 2023

(54) AUTOMATED ENVIRONMENT PROVIDING FEEDBACK BASED ON USER ROUTINE

(71) Applicant: Apple Inc., Cupertino, CA (US)

(72) Inventors: Lukas M. Marti, San Jose, CA (US); Ronald Keryuan Huang, San Jose, CA (US)

(73) Assignee: Apple Inc., Cupertino, CA (US)

(*) Notice: Subject to any disclaimer, the term of this patent is extended or adjusted under 35 U.S.C. 154(b) by 500 days.

(21) Appl. No.: 16/894,583

(22) Filed: Jun. 5, 2020

(65) Prior Publication Data
US 2020/0301499 A1 Sep. 24, 2020

Related U.S. Application Data

(63) Continuation of application No. 14/856,252, filed on Sep. 16, 2015, now Pat. No. 10,719,122.

(60) Provisional application No. 62/057,714, filed on Sep. 30, 2014.

(51) Int. Cl.
| | |
|---|---|
| G06F 3/01 | (2006.01) |
| H04L 12/28 | (2006.01) |
| H04L 67/125 | (2022.01) |
| H04L 67/50 | (2022.01) |

(52) U.S. Cl.
CPC ............ *G06F 3/01* (2013.01); *H04L 12/2829* (2013.01); *H04L 67/125* (2013.01); *H04L 67/535* (2022.05); *G05B 2219/2642* (2013.01)

(58) Field of Classification Search
CPC ........ G06F 3/01; G06F 3/011; H04L 12/2829; H04L 67/125; H04L 67/535; H04L 12/2803; G05B 2219/2642
See application file for complete search history.

(56) References Cited

U.S. PATENT DOCUMENTS

| | | | |
|---|---|---|---|
| 8,214,061 B2 | 7/2012 | Westrick, Jr. et al. | |
| 8,255,090 B2 | 8/2012 | Frader-Thompson et al. | |
| 8,630,741 B1 | 1/2014 | Matsuoka et al. | |
| 8,909,950 B1 | 12/2014 | Levchuk et al. | |

(Continued)

FOREIGN PATENT DOCUMENTS

| | | |
|---|---|---|
| CN | 101197744 | 6/2008 |
| CN | 101459725 | 6/2009 |

(Continued)

OTHER PUBLICATIONS

U.S. Appl. No. 14/856,252, "Advisory Action", dated Feb. 27, 2020, 3 pages.

(Continued)

*Primary Examiner* — Tejal Gami
(74) *Attorney, Agent, or Firm* — Kilpatrick Townsend & Stockton LLP

(57) ABSTRACT

A device in an automated environment can detect patterns in the user's interactions with accessories in the automated environment and can provide feedback to the user based on the patterns. Examples include: suggesting automation of particular actions based on the patterns; suggesting actions that conform to the pattern when the user performs part of the pattern; or suggesting changes to a pattern to conform to a preferred pattern. A state of the group of accessory devices can be changed together based on the pattern of accessory state changes for the group of accessory devices.

20 Claims, 7 Drawing Sheets

(56) References Cited

U.S. PATENT DOCUMENTS

| | | |
|---|---|---|
| 8,989,910 B1 | 3/2015 | Klots |
| 8,996,188 B2 | 3/2015 | Frader-Thompson et al. |
| 9,274,512 B1 | 3/2016 | Zima |
| 9,351,381 B2 | 5/2016 | Verfuerth et al. |
| 9,432,210 B2 | 8/2016 | Bhargava et al. |
| 9,482,442 B1 | 11/2016 | Mengle et al. |
| 10,416,205 B2 | 9/2019 | Marti et al. |
| 10,416,625 B2 | 9/2019 | Marti et al. |
| 10,496,050 B2 | 12/2019 | Marti et al. |
| 10,571,873 B2 | 2/2020 | Marti et al. |
| 10,719,122 B2 | 7/2020 | Marti et al. |
| 2007/0273307 A1 | 11/2007 | Westrick, Jr. et al. |
| 2008/0036591 A1 | 2/2008 | Ray |
| 2008/0177678 A1 | 7/2008 | Di Martini et al. |
| 2009/0195349 A1 | 8/2009 | Frader-thompson et al. |
| 2010/0082169 A1 | 4/2010 | Crist et al. |
| 2010/0156665 A1 | 6/2010 | Krzyzanowski et al. |
| 2010/0201567 A1* | 8/2010 | Lydon .................... H04W 8/24 342/357.22 |
| 2010/0286937 A1 | 11/2010 | Hedley et al. |
| 2011/0185203 A1 | 7/2011 | Carlson et al. |
| 2011/0290893 A1 | 12/2011 | Steinberg |
| 2012/0054125 A1 | 3/2012 | Clifton et al. |
| 2012/0086562 A1 | 4/2012 | Steinberg |
| 2012/0131504 A1 | 5/2012 | Fadell et al. |
| 2012/0191257 A1 | 7/2012 | Corcoran et al. |
| 2012/0215369 A1 | 8/2012 | Desai et al. |
| 2012/0286723 A1 | 11/2012 | Ukita et al. |
| 2012/0316808 A1 | 12/2012 | Frader-Thompson et al. |
| 2013/0144445 A1 | 6/2013 | Steinberg |
| 2013/0218360 A1 | 8/2013 | Najewicz et al. |
| 2013/0262197 A1 | 10/2013 | Kaulgud et al. |
| 2014/0039690 A1 | 2/2014 | Steinberg |
| 2014/0067130 A1 | 3/2014 | Pillai et al. |
| 2014/0070959 A1 | 3/2014 | Bhargava et al. |
| 2014/0074257 A1 | 3/2014 | Bhargava et al. |
| 2014/0084165 A1 | 3/2014 | Fadell et al. |
| 2014/0118148 A1 | 5/2014 | Edlund et al. |
| 2014/0136242 A1 | 5/2014 | Weekes et al. |
| 2014/0156028 A1 | 6/2014 | Subramaniam et al. |
| 2014/0181521 A1 | 6/2014 | Hemphill et al. |
| 2014/0191575 A1 | 7/2014 | Gaucher et al. |
| 2014/0201315 A1 | 7/2014 | Jacob et al. |
| 2014/0222954 A1 | 8/2014 | Vaccari et al. |
| 2014/0229018 A1 | 8/2014 | Steinberg |
| 2014/0266669 A1 | 9/2014 | Fadell et al. |
| 2014/0278051 A1 | 9/2014 | McGavran et al. |
| 2014/0316581 A1 | 10/2014 | Fadell et al. |
| 2015/0025698 A1 | 1/2015 | Strelec et al. |
| 2015/0074228 A1 | 3/2015 | Drake |
| 2015/0081118 A1 | 3/2015 | Endrizzi et al. |
| 2015/0168001 A1 | 6/2015 | Steinberg |
| 2015/0168002 A1 | 6/2015 | Plitkins et al. |
| 2015/0168003 A1 | 6/2015 | Stefanski et al. |
| 2015/0222517 A1 | 8/2015 | McLaughlin et al. |
| 2015/0223416 A1 | 8/2015 | Eng et al. |
| 2015/0262132 A1 | 9/2015 | Miller et al. |
| 2015/0308084 A1 | 10/2015 | Thompson et al. |
| 2015/0308706 A1 | 10/2015 | Bunker et al. |
| 2015/0323915 A1 | 11/2015 | Warren et al. |
| 2015/0330652 A1 | 11/2015 | Kim |
| 2015/0350031 A1 | 12/2015 | Burks et al. |
| 2015/0351145 A1 | 12/2015 | Burks et al. |
| 2016/0091871 A1 | 3/2016 | Marti et al. |
| 2016/0161310 A1 | 6/2016 | Leaders et al. |
| 2016/0224033 A1 | 8/2016 | Gingrich |
| 2017/0070842 A1 | 3/2017 | Kulp et al. |
| 2017/0222894 A1 | 8/2017 | Park et al. |

FOREIGN PATENT DOCUMENTS

| | | |
|---|---|---|
| CN | 201548850 | 8/2010 |
| CN | 102736599 | 10/2012 |
| CN | 102984039 | 3/2013 |
| EP | 2741448 | 6/2014 |
| WO | 2013184108 | 12/2013 |

OTHER PUBLICATIONS

U.S. Appl. No. 14/856,252, "Advisory Action", dated Aug. 24, 2018, 4 pages.

U.S. Appl. No. 14/856,252, "Final Office Action", dated Nov. 20, 2019, 17 pages.

U.S. Appl. No. 14/856,252, "Final Office Action", dated May 3, 2018, 19 pages.

U.S. Appl. No. 14/856,252, "Final Office Action", dated Oct. 25, 2018, 19 pages.

U.S. Appl. No. 14/856,252, "Non-Final Office Action", dated Oct. 5, 2017, 15 pages.

U.S. Appl. No. 14/856,252, "Non-Final Office Action", dated May 6, 2019, 17 pages.

U.S. Appl. No. 14/856,252, "Notice of Allowance", dated Mar. 19, 2020, 11 pages.

Chen et al., "Energy Outlier Detection in Smart Environments", Artificial Intelligence and Smarter Living—The Conquest of Complexity, Papers from the 2011 AAAI Workshop (WS-11-07), 2011, 6 pages.

Chen et al., "Mining Correlation Patterns among Appliances in Smart Home Environment", PAKDD, Part III, LNAI, 8444, 2014, pp. 222-233.

Chen, Yi-Cheng, et al., "Significant Correlation Pattern Mining in Smart Homes," Association for Computing Machinery, May 20, 2015, [online], [retrieved from the internet], <URL: dl.acm.org/citation.cfm?id=2700484>, 20 pages.

Chinese Patent Application No. 201580046349.1, "Office Action", dated Mar. 10, 2020, 10 pages.

Fatima et al., "A Unified Framework for Activity Recognition-Based Behavior Analysis and Action Prediction in Smart Homes", Sensors, vol. 13, 2013, pp. 2682-2699.

Iglesias et al., "A Global Approach of Habit Profiles for Smart Home Control", Proceedings of BS2013, 13th Conference of International Building Performance Simulation Association, Chambery, France, Aug. 26, 2013, 8 pages.

Jakkula et al., "Temporal Pattern Discovery for Anomaly Detection in a Smart Home", Proceedings of the 3rd IET Conference on Intelligent Environments, 2007, pp. 339-345.

Mozer et al., "Chapter 12 Lessons from an Adaptive Home", Smart Environments: Technologies, Protocols, and Applications, Jan. 28, 2005, 15 pages.

Schweizer et al., "Learning Frequent and Periodic Usage Patterns in Smart Homes", Master Thesis, University of Applied Sciences and Arts Northwestern Switzerland School of Business, Jan. 31, 2014, 133 pages.

Weiss, Markus, et al., "Leveraging smart meter data to recognize home appliances," [online] 2012, [retrieved from the internet], <URL: www.im.ethz.ch/publications/weiss_Percom2012.pdf<, 8 pages.

\* cited by examiner

AUTOMATED ENVIRONMENT PROVIDING FEEDBACK BASED ON USER ROUTINE

CROSS-REFERENCES TO RELATED APPLICATIONS

This application is a continuation of U.S. patent application Ser. No. 14/856,252, filed Sep. 16, 2015, which claims the benefit of U.S. Provisional Application No. 62/057,714, filed Sep. 30, 2014, the disclosures of which are incorporated by reference in their entirety.

The present disclosure is also related to the following commonly-owned applications: U.S. patent application Ser. No. 14/614,914, filed Feb. 5, 2015 (Published as 2015/0222517); U.S. patent application Ser. No. 14/725,891, filed May 29, 2015; U.S. patent application Ser. No. 14/725,912, filed May 29, 2015 (Published as 2015/0350031); and U.S. patent application Ser. No. 14/081,895, filed Nov. 15, 2013 (published as 2014/0278051), the disclosures of which are incorporated by reference in their entirety.

BACKGROUND

The present disclosure relates in general to an accessory management system and in particular to an automated environment that can provide feedback based on a detected user routine.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc. It is sometimes desirable to automate operation of such devices.

SUMMARY

An automated environment can allow users' mobile devices (and/or other "controllers") to control various other devices (referred to as "accessories") in the automated environment. The user can interact with an accessory by operating a controller that can communicate a message to the accessory in response to user input. In some instances, accessory operation can be automated. For example, a controller can be programmed to automatically instruct an accessory to initiate a specific action when certain triggering conditions are met, such as turning on a heating system, changing a thermostat's target temperature at a particular time, or turning on a light if the controller detects an ambient light level below a threshold. One or more controller devices can also act as a "coordinator" to manage communications between multiple controllers and multiple accessories.

Certain embodiments of the present invention pertain to situations where the user interacts with accessories using a controller. The controller (or another device in the automated environment) can detect patterns in the user's interactions with accessories and can provide feedback to the user based on the detected patterns. For example, if the user's action deviates from a detected pattern (e.g., forgetting to turn out the lights when leaving the environment), the controller can remind the user to take an omitted action. Additionally or instead, the controller can suggest automating the detected pattern. As another example, if the detected pattern deviates from a preferred pattern (e.g., the user habitually fails to turn off lights when leaving a room or the environment), the controller device can suggest changing the pattern and can remind the user to do so.

Other embodiments are directed to systems, portable consumer devices, and computer readable media associated with methods described herein.

The following detailed description together with the accompanying drawings will provide a better understanding of the nature and advantages of the present invention.

DETAILED DESCRIPTION

Certain embodiments of the present invention pertain to situations where the user interacts with accessories using a controller. The controller (or another device in the automated environment) can detect patterns in the user's interactions with accessories and can provide feedback to the user based on the detected patterns. For example, if the user's action deviates from a detected pattern (e.g., forgetting to turn out the lights when leaving the environment), the controller can remind the user to take an omitted action. Additionally or instead, the controller can suggest automating the detected pattern. As another example, if the detected pattern deviates from a preferred pattern (e.g., the user habitually fails to turn off lights when leaving a room or the environment), the controller device can suggest changing the pattern and can remind the user to do so.

To provide context for understanding the present invention, example implementations of an automated environment and a system that can determine a user's established routine and detect patterns of accessory interaction will be described. Thereafter, specific examples of providing feedback based on a detected pattern will be described.

I. Example Environment

Figure 1:
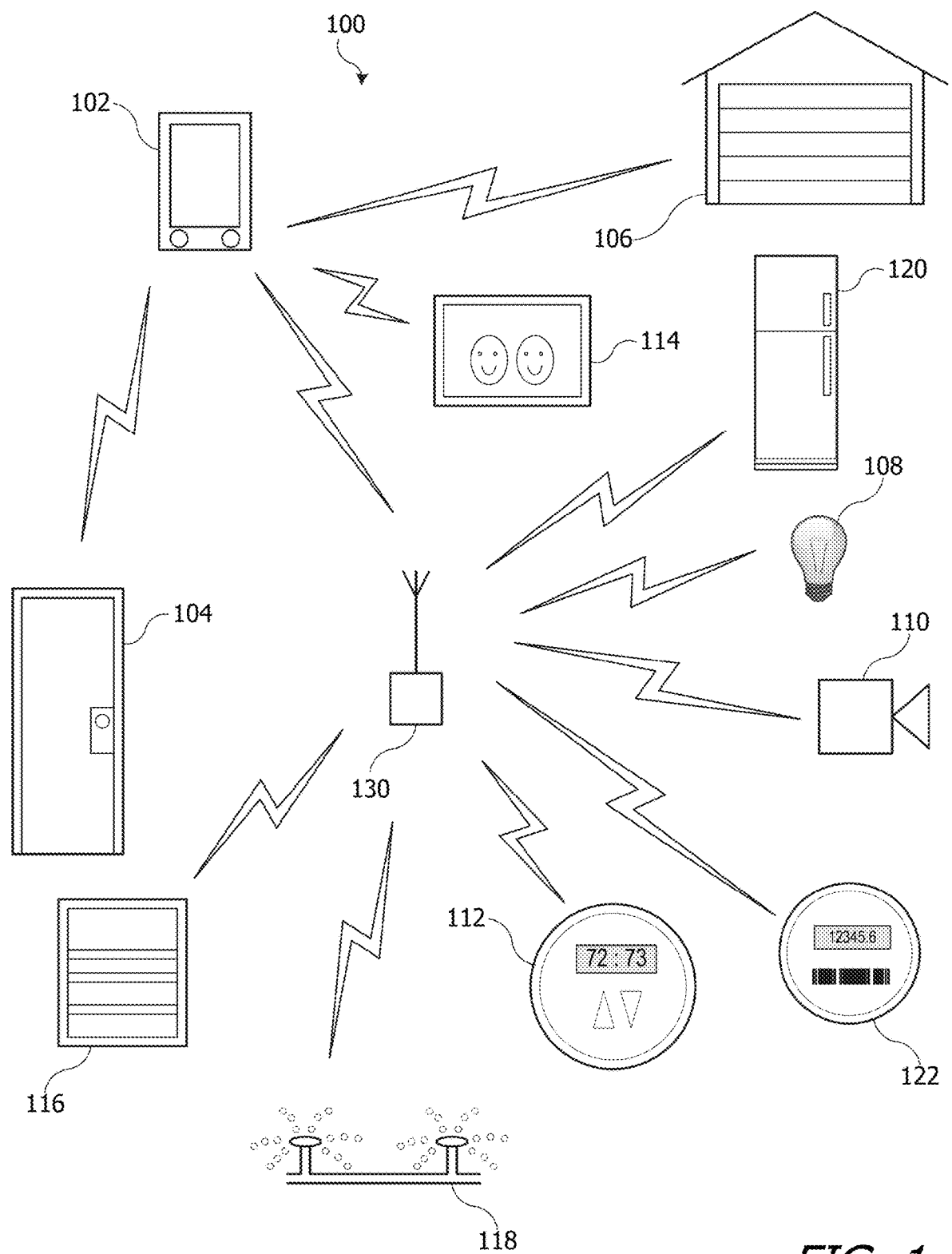
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. patent application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) can provide a user interface and communicate with the base station to effect control over accessories. In some embodiments, the base station can function as a coordinator or proxy for the accessories, e.g., as described below.

As used herein, an "accessory" can be any device or thing located in an environment that is controllable (at least to some degree) by a controller such as controller 102. Examples of accessory devices in a home environment can include door lock 104, garage door system 106, light fixture 108, security camera 110, thermostat 112, TV 114, window 116, sprinkler system 118, household appliance (e.g., refrigerator) 120, and utility meter (e.g., electric meter) 122. In some instances, controller 102 can communicate directly with an accessory; for instance, controller 102 is shown communicating directly with door lock 104, garage door system 106, and TV 114. In other instances, controller 102 can communicate via an intermediary. For instance, controller 102 is shown communicating via a wireless network access point 130 with accessories 108, 110, 112, 116, 118, 120, 122 that are on a wireless network provided by access point 130. As noted above, in some embodiments, controller 102 can include a base station, and base station functionality can be integrated into access point 130 or into one of the accessories that is to be controlled (e.g., thermostat 112). In some embodiments, a base station can function as a proxy or coordinator as described below.

Various communication transports and combinations of transports can be used, and different transports can be used with different devices. For example, some wireless transports such as Bluetooth® transports (e.g., Bluetooth Classic, Bluetooth LE, and other transports conforming to standards promulgated by Bluetooth SIG, Inc., headquartered in Kirkland, WA) can support direct point-to-point communication between devices within a limited range. Other wireless transports such as Wi-Fi® transports (conforming to standards promulgated by Wi-Fi Alliance, headquartered in Austin, TX) can define a wireless network with a central access point that routes communications between different devices on the network. Further, while wireless communication transports are shown, wired transports can also be provided for some or all of the accessories. For example, light fixture 108 can be connected to access point 130 by a wired connection, and controller 102 can communicate with light fixture 108 by sending messages wirelessly to access point 130, which can deliver the messages to light fixture 108 via the wired connection. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-122. Different controller devices can be configured to communicate with different subsets of the accessories; for example, a child's controller might be blocked from modifying settings on thermostat 112, while a parent's controller device is permitted to modify the settings. Such permissions can be configured and controlled, for example, as described in above-referenced U.S. patent application Ser. Nos. 14/725,891 and 14/725,912.

In some embodiments, a universal accessory protocol can facilitate communication by a controller 102 with one or more accessories 104-122. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. Examples of an accessory model based on services and characteristics are described in above-referenced U.S. patent application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages, and the message format can be the same across different accessories. Examples of message formats are described in above-referenced U.S. patent application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. patent application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other (e.g., in a secure storage element), so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a secure session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. patent application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be "universal," meaning that they can be applied in any context with one or more controllers and one or more accessories regardless of accessory function or controller form factor or specific interfaces.

II. Example Accessory and Controller Network

For purposes of implementing an automated environment, it is desirable to allow accessories to be controlled by multiple controllers and to allow one controller to control multiple accessories. Accordingly, accessories and/or controllers can be connected into accessory networks and controller networks. This can be done, for instance, by establishing pairings between various accessories and various controllers and providing a security protocol such that an accessory only responds to a controller if a pairing has been established. Examples of establishing pairings and associated security protocols are described in above-referenced U.S. patent application Ser. Nos. 14/614,914; 14/725,891; and U.S. patent application Ser. No. 14/725,912.

Figure 2:
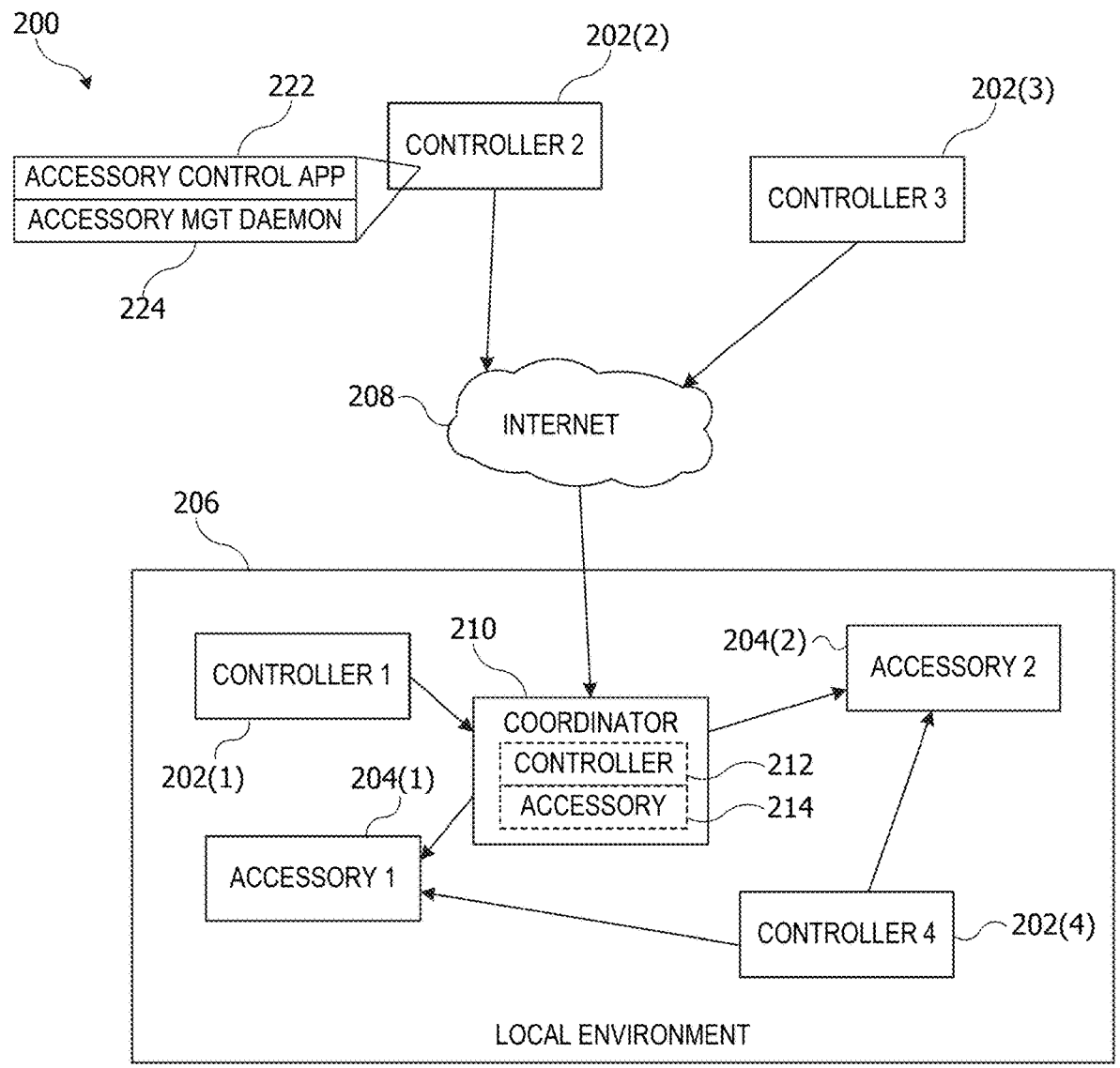
FIG. 2 shows an example of a network configuration according to an embodiment of the present invention.

In some embodiments, an automated environment can include a "coordinator" device that can act as an intermediary or proxy between controllers and accessories. FIG. 2 shows an example of a network configuration 200 according to an embodiment of the present invention that allows multiple controllers 202 to interact with multiple accessories 204 in a local environment 206. While two accessories and four controllers are shown, it is to be understood that any number of controllers and/or accessories can be included.

Controllers 202(1)-202(4) can each be similar to controller 102 of FIG. 1. For example, each controller 202 can be a mobile device (e.g., a mobile phone or wearable device). Accessories 204(1) and 204(2) can be similar to any of accessories 104-122 of FIG. 1 and can be any devices located in a "local environment" 206 (e.g., a home environment). For purposes of description, it is assumed that accessories 204 remain in local environment 206, while controllers 202, being mobile devices, can be sometimes within and sometimes outside local environment 206.

In this example, controllers 202(1) and 202(4) are currently located in local environment 206 with accessories 204(1) and 204(2). For example, controllers 202(1), 202(4), and accessories 204(1), 204(2) can be on the same local area network (LAN), such as a Wi-Fi network or within Bluetooth communication range or the like. Controllers 202(2) and 202(3) are currently located outside local environment 206 but are connected to a wide-area communication network 208 (e.g., the Internet); such controllers are said to be "remote" from accessories 204. In this example, it is assumed that accessories 204 can communicate only within local environment 206 and are not directly connected to wide-area communication network 208. Thus, communication between controller 202(2) or 202(3) with accessories 204 would proceed through an indirect path.

A "coordinator" 210 (also referred to as a coordinator device) can be a device that facilitates communication between remote controllers 202(2), 202(3) and accessories 304(1) and 304(2). Coordinator 210 can be any electronic device that is present in local environment 206 and capable of communicating with accessories 204. For example, coordinator 210 can be a mobile device that happens to be in local environment 206. As another example, coordinator 210 can be a device that is expected to stay in local environment 206 and that is expected to be powered on and available for communication most or all of the time. (It is to be understood that coordinator 210 can occasionally be unavailable, e.g., in connection with software or firmware upgrades, power outages, or other intermittent occurrences.) For example, coordinator 210 can be implemented in a desktop computer, a network access-point unit, a dedicated accessory-control base station, a set-top box for a television or other appliance (which can implement coordinator and/or other base station functionality in addition to interacting with the television or other appliance), or any other electronic device as desired.

In some embodiments, coordinator 210 can act as a relay or proxy between controllers 202 and accessories 204. Thus, for example, coordinator 210 can present itself to controllers 202 as a virtual accessory 214 and to accessories 204 as a virtual controller 212. In operation, a controller, e.g., controller 202(2), can establish a secure communication session with coordinator 210 and send a message to coordinator 210 indicating that it wishes to communicate with an accessory in local environment 206, e.g., accessory 204(1). Coordinator 210 can establish a secure communication session with accessory 204(1) and use that session to relay messages between controller 202(2) and accessory 204(1). For example, through the relay, controller 202(2) can establish its own secure session with accessory 204(1), then send control messages and receive responses within the secure session. In some embodiments, coordinator 210 can pass the messages back and forth (optionally adding its own authenticated signature or encryption layer) while remaining agnostic to their content. Examples of such operations are described in above-referenced U.S. patent application Ser. Nos. 14/725,891 and 14/725,912.

In some embodiments, controllers 202 can prefer to communicate with accessories 204 via coordinator 210 whenever coordinator 210 is available. Thus, for example, controller 202(1), which is in local environment 206, can communicate with coordinator 210 rather than directly with accessories 204. Remotely located controllers 202(2) and 202(3) do not have direct communication with accessories 204 and also communicate via coordinator 210. Alternatively, controllers 202 can communicate directly with accessories 204 when in local environment 206, e.g., as shown for controller 202(4). Any combination of direct and/or indirect communication with accessories can be supported.

Where a controller-coordinator pairing and one or more coordinator-accessory pairings are established, coordinator 210 can present itself to controllers 202 as an "accessory network" via which controller 202 can access all the services of all accessories 204 with which coordinator 210 has an established pairing. For instance, coordinator 210 can present an accessory network modeled as a "home" or other environment. The model can define various physical and/or logical groupings of accessories that can be controlled in a coordinated manner. Controllers 202 can operate any accessory in the network by interacting with coordinator 210. In some instances, operation of particular accessories by particular controllers can be restricted using a system of permissions.

In some embodiments, coordinator 210 can operate as an intelligent agent for allowing controllers 202 to operate accessories 204, rather than simply relaying messages as described above. For example, when controller 202(1) receives a user request to interact with accessory 204(1), controller 202(1) can provide instructions for accessory 204(1) to coordinator 210. Coordinator 210 can receive the instructions, establish a communication session with accessory 204(1) and send appropriate control messages to accessory 204(1). In some embodiments, the messages sent to accessory 204(1) need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204(1) to coordinator 210. Coordinator 210 can analyze the received instructions, e.g., to detect and resolve conflicts such as where controller 202(1) instructs coordinator 210 to turn accessory 204(1) on while controller 202(2) instructs coordinator 210 to turn accessory 204(1) off. Coordinator 210 can be programmed with priority rules or other rules for resolving conflicts (e.g., "on" takes priority over "off"; instructions from controller 202(1) take priority over instructions from controller 202(2); etc.). Coordinator 210 can apply the priority rule to resolve any conflicts and can communicate instructions to accessory 204(1) based on the resolution. When a response is received from accessory 204(1), coordinator 210 can determine whether to send a corresponding message (or a different message) to controller 202(1) and/or to controller 202(2). Thus, coordinator 210 is not limited to acting as a passive relay for messages between controllers and accessories but can actively intervene to resolve conflicting instructions, enforce any limitations that may exist on the privileges or permissions granted to particular controllers or users, and so on. Further examples of operation of a coordinator such as coordinator 210 are described in above-referenced U.S. patent application Ser. Nos. 14/725,891 and 14/725,912.

From a user's perspective, operation of controller 202(2) to control accessories 204 can be the same regardless of whether the connection to accessories 204 is direct or through coordinator 210. For example, as shown for controller 202(2), any of controllers 202 can execute an accessory-control application 222 that generates a user interface (such as a graphical user interface) for controlling any of accessories 204, e.g., accessory 204(1). The interface can include display elements to display current settings of accessory 204, user-operable controls to change some or all of the settings, etc. Accessory-control application 222 can interact with an operating-system process 224 (referred to herein as an "accessory management daemon") that manages the communication between controller 202(2) and accessory 204(1). Accessory management daemon 224 can present an application program interface (API) to application 222 in a manner that is transport-agnostic, so that application 222 can, for instance, invoke an API function indicating that a message should be sent to accessory 204(1). Accessory management daemon 224 can, transparently to the user, create either a direct or indirect (e.g., through coordinator 210) communication path to accessory 204(1) and send the message. In some embodiments, accessory management daemon 224 can also handle operations such as pair verify and encryption/decryption of communications within a pair-verified session, transparently to application 222.

Network configuration 200 can support automated operation of accessories 204. For example, any of controllers 202 or coordinator 210 can execute program code that sends control messages to one or more of accessories 204 upon the occurrence of certain triggering conditions, such as a particular time of day or a particular user action (e.g., user leaving the house). The control messages can instruct the accessory to initiate an action, also called an accessory action. Thus, for example, a thermostat accessory (e.g., accessory 112 of FIG. 1) can be instructed to heat (or cool) the house to a desired temperature at a particular time based on the user's expected arrival, or to turn off the heat (or cooling) when the user leaves. A user leaving (or entering) local environment 206 can be detected using various techniques. For example, controller 202(1) (or any other controller 202) can be a mobile device that the user habitually wears or carries wherever he or she goes and that automatically connects to a wireless local area network (e.g., a home-based Wi-Fi network) when it is within signal range of the network. When controller 202(1) disconnects from the network (and remains disconnected for a minimum time), coordinator 210 (or another device that is resident in local environment 206) can detect the disconnection and infer that the user has left local environment 206. Similarly, when controller 202(1) subsequently reconnects, coordinator 210 can infer that the user has returned to local environment 206. Any other information available to coordinator 210 can be used, including input from presence or proximity sensors that may be installed in local environment 206, location data provided by the user's controller 202(1), inferences from user interactions with particular accessories, and so on.

It will be appreciated that network configuration 200 is illustrative and that variations and modifications are possible. Any number of controllers can establish pairings with an accessory, and each controller can be any type of electronic device that supports user interaction (e.g., through a local or remote user interface) and that can communicate with other devices via wired and/or wireless channels. Examples include mobile phones, tablets, wearable devices, laptop computers, desktop computers, dedicated accessory-control base stations, and so on. The accessory can be any electronic device that has a controllable function and that is capable of communicating with other devices via wired and/or wireless interfaces. Examples include lamps (or lights), fans, thermostats, appliances (refrigerator, oven, dishwasher, clothes washer, clothes dryer, vacuum cleaner, etc.), door locks, door openers, media storage and/or playback devices (TV, cable or satellite television interface unit, DVD player, digital video recorder, digital music player, streaming media device, etc.), utility meters (e.g., water, electric, and/or gas meters that can be read by a controller), irrigation systems (e.g., sprinklers, drip irrigation), and so on.

III. Example Devices

Figure 3:
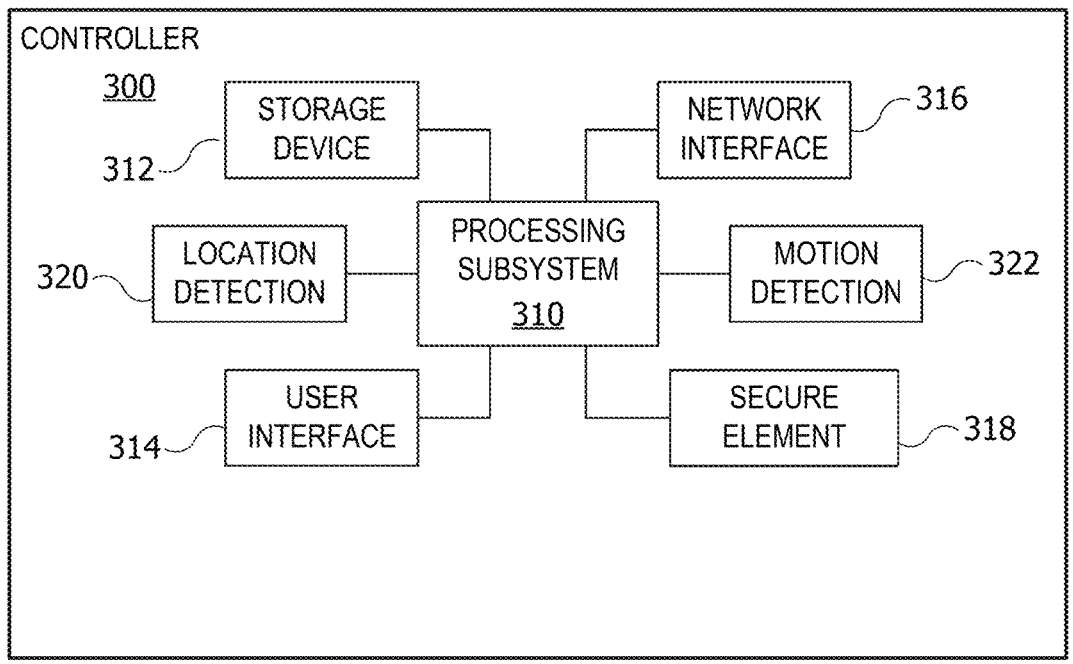
FIG. 3 is a simplified block diagram of a controller according to an embodiment of the present invention.

FIG. 3 is a simplified block diagram of a controller 300 according to an embodiment of the present invention. Controller 300 can implement any or all of the controller functions, behaviors, and capabilities described herein, as well as other functions, behaviors, and capabilities not expressly described. Controller 300 can include processing subsystem 310, storage device 312, user interface 314, network interface 316, secure element 318, location detection element 320, and motion detection element 322. Controller 300 can also include other components (not explicitly shown) such as a battery, power controllers, and other components operable to provide various enhanced capabilities. In various embodiments, controller 300 can be implemented in a desktop computer, laptop computer, tablet computer, smart phone, wearable computing device, or other systems having any desired form factor. Further, as noted above, controller 300 can be implemented partly in a base station and partly in a mobile unit that communicates with the base station and provides a user interface.

Storage device 312 can be implemented, e.g., using disk, flash memory, or any other non-transitory storage medium, or a combination of media, and can include volatile and/or non-volatile media. In some embodiments, storage device 312 can store one or more application and/or operating system programs to be executed by processing subsystem 310, including programs to implement various operations described herein as being performed by a controller. For example, storage device 312 can store a universal controller application that can read an accessory description record and generate a graphical user interface for controlling the accessory based on information therein (e.g., as described in above-referenced U.S. patent application Ser. No. 14/614, 914). Storage device 312 can also store a "user routine" program that can determine a user routine and detect deviations from that routine (e.g., as described below). In some embodiments, portions (or all) of the controller functionality described herein can be implemented in operating system programs rather than applications. In some embodiments, storage device 312 can also store apps designed for specific accessories or specific categories of accessories (e.g., an IP camera app to manage an IP camera accessory or a security app to interact with door lock accessories).

User interface 314 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 314 to invoke the functionality of controller 300 and can view and/or hear output from controller 300 via output devices of user interface 314.

Processing subsystem 310 can be implemented as one or more integrated circuits, e.g., one or more single-core or multi-core microprocessors or microcontrollers, examples of which are known in the art. In operation, processing subsystem 310 can control the operation of controller 300. In various embodiments, processing subsystem 310 can execute a variety of programs in response to program code and can maintain multiple concurrently executing programs or processes. At any given time, some or all of the program code to be executed can be resident in processing subsystem 310 and/or in storage media such as storage device 312.

Through suitable programming, processing subsystem 310 can provide various functionality for controller 300. For example, in some embodiments, processing subsystem 310 can implement various processes (or portions thereof) described herein as being implemented by a controller. Processing subsystem 310 can also execute other programs to control other functions of controller 300, including application programs that may be stored in storage device 312. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Network interface 316 can provide voice and/or data communication capability for controller 300. In some embodiments, network interface 316 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, network interface 316 can provide wired network connectivity (e.g., Ethernet) in addition to or instead of a wireless interface. Network interface 316 can be implemented using a combination of hardware (e.g., driver circuits, antennas, modulators/demodulators, encoders/decoders, and other analog and/or digital signal processing circuits) and software components. In some embodiments, network interface 316 can support multiple communication channels concurrently, using the same transport or different transports.

Secure element 318 can be an integrated circuit or the like that implements or supports cryptographic operations of controller 300, including any or all cryptographic operations related to pair setup, pair add, and pair verify. Secure element 318 can appear as a "black box" to the rest of controller 300. Thus, for instance, network interface 316 can receive a message in encrypted form that it cannot decrypt and can simply deliver the message to processing subsystem 310. Processing subsystem 310 may also be unable to decrypt the message, but it can recognize the message as encrypted and deliver it to secure element 318. Secure element 318 can decrypt the message and determine what information to return to processing subsystem 310. As a result, certain information can be available only within secure element 318. If secure element 318 is a single IC that executes code only from its own secure repository, this can make extraction of the information extremely difficult, which can provide a high degree of security. Examples of secure elements are described further in above-referenced U.S. patent application Ser. Nos. 14/725,891 and 14/725, 912.

Location detection element 320 can include hardware and/or software components operable to determine a geographical location of controller 300. For example, location detection element 320 can implement a GPS receiver. Other location-determination technologies can also be used, such as Wi-Fi fingerprinting (distinguishing and recognizing locations based on availability and signal strength of various Wi-Fi networks), cellular tower triangulation (based on detecting proximity to different transceiver "cells" in a cellular voice or data network), and so on.

Motion detection element 322 can include hardware and/or software components operable to detect and measure motion of controller 300. For example, motion detection element 322 can include motion sensors such as accelerometers, gyroscopic motion sensors, or the like. In some embodiments, motion detection element 322 can process signals from the motion sensors and infer a specific activity or motion of the controller or a user (e.g., whether the user is riding in a vehicle, walking, running, etc.). In some embodiments, controller 300 can also incorporate other types of environmental sensors, such as ambient light sensors, ambient sound sensors, physiological sensors, etc.

Figure 4:
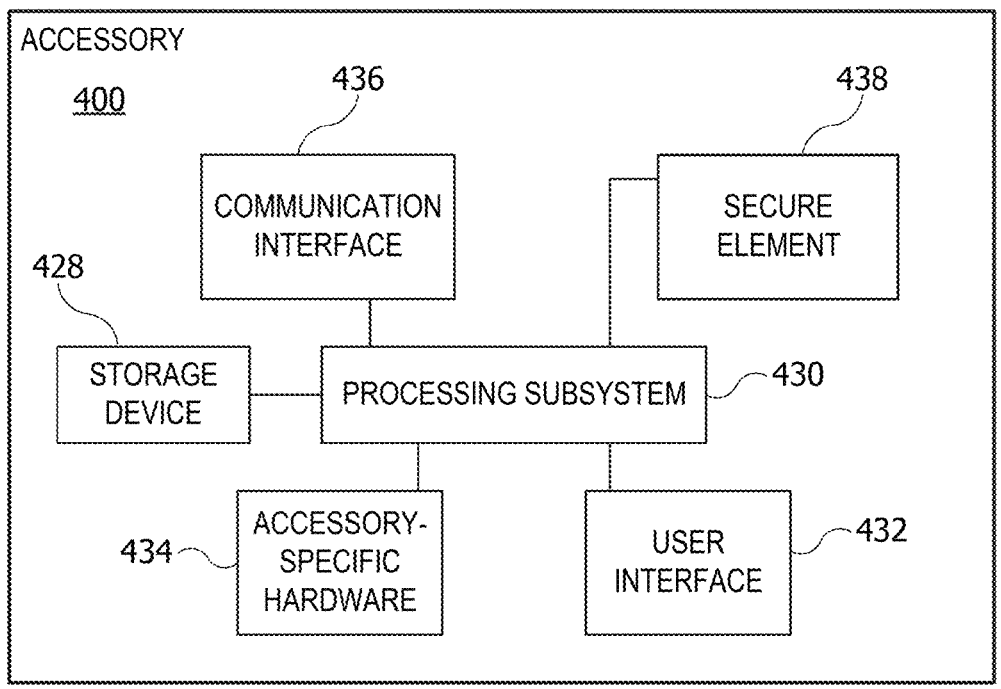
FIG. 4 is a simplified block diagram of an accessory according to an embodiment of the present invention.

FIG. 4 is a simplified block diagram of an accessory 400 according to an embodiment of the present invention. Accessory 400 can implement any or all of the accessory functions, behaviors, and capabilities described herein, as well as other functions, behaviors, and capabilities not expressly described. Accessory 400 can include storage device 428, processing subsystem 430, user interface 432, accessory-specific hardware 434, communication interface 436, and secure element 438. Accessory 400 can also include other components (not explicitly shown) such as a battery, power controllers, and other components operable to provide various enhanced capabilities. Accessory 400 is representative of a broad class of accessories that can be operated by a controller such as controller 300, and such accessories can vary widely in capability, complexity, and form factor. For instance, accessory 400 can implement any of accessories 104-122 of FIG. 1.

Storage device 428 can be implemented, e.g., using disk, flash memory, or any other non-transitory storage medium, or a combination of media, and can include volatile and/or non-volatile media. In some embodiments, storage device 428 can store one or more application programs to be executed by processing subsystem 430, including programs to implement various operations described above as being performed by an accessory, as well as operations related to particular accessory behaviors. Storage device 428 can also store an accessory descriptor record that can be furnished to controller devices, e.g., during device discovery as described in above-referenced U.S. patent application Ser. No. 14/614,914. Storage device 428 can also store accessory state information and any other data that may be used during operation of accessory 400.

Processing subsystem 430 can include, e.g., one or more single-core or multi-core microprocessors and/or microcontrollers executing program code to perform various functions associated with accessory 400. For example, processing subsystem 430 can implement various processes (or portions thereof) described above as being implemented by an accessory, e.g., by executing program code stored in storage device 428. Processing subsystem 430 can also execute other programs to control other functions of accessory 400. In some instances programs executed by processing subsystem 430 can interact with a controller (e.g., controller 300), e.g., by generating messages to be sent to the controller and/or receiving messages from the controller.

User interface 432 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 400, a user can operate input devices of user interface 432 to invoke functionality of accessory 400. Some accessories may provide a minimal or no user interface.

Accessory-specific hardware 434 can include any other components that may be present in accessory 400 to enable its functionality. For example, in various embodiments, accessory-specific hardware 434 can include one or more storage devices using fixed or removable storage media; GPS receiver; power supply and/or power management circuitry; a camera; a microphone; one or more actuators; control switches; fans; motors; heating elements; valves; position sensors (e.g., position encoders); environmental sensors (e.g., temperature sensor, pressure sensor, accelerometer, chemical sensor, etc.); and so on. It is to be understood that any type of accessory functionality can be supported by providing appropriate accessory-specific hardware 434 and that accessory-specific hardware can include mechanical as well as electrical or electronic components.

Communication interface 436 can provide voice and/or data communication capability for accessory 400. In some embodiments, communication interface 436 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, communication interface 436 can provide wired network connectivity (e.g., Ethernet) in addition to or instead of a wireless interface. Communication interface 436 can be implemented using a combination of hardware (e.g., driver circuits, antennas, modulators/demodulators, encoders/decoders, and other analog and/or digital signal processing circuits) and software components. In some embodiments, communication interface 436 can support multiple communication channels concurrently, using the same transport or different transports.

Secure element 438 can be an integrated circuit or the like that implements or supports cryptographic operations of accessory, including any or all cryptographic operations related to pair setup, pair add, or pair verify. Secure element 438 can operate similarly to secure element 318 in controller 300. Examples of secure elements are described further in above-referenced U.S. patent application Ser. Nos. 14/725,891 and 14/725,912.

Accessory 400 can be any electronic apparatus that interacts with controller 300. In some embodiments, controller 300 can provide control over operations of accessory 400 as described above. For example, controller 300 can provide a user interface for accessory 400 that can include both input and output controls (e.g., a display screen to display current state information obtained from accessory 400 and an input control such as a touchscreen overlay to allow the user to initiate changes to the state information, resulting in a change in some attribute of the accessory's state). In various embodiments, controller 300 can control any function of accessory 400 and can also receive data from accessory 400. Further, in some instances, accessory 400 can operate as a coordinator for other accessories, e.g., as described above.

It will be appreciated that the system configurations and components described herein are illustrative and that variations and modifications are possible. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. For example, as noted above, coordinator 210 of FIG. 2 can implement both accessory and controller functionality, and the same hardware components can be used for both. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

IV. Example of Determining a User Routine

As noted above, it may be desirable for a controller (or coordinator) to automate operation of an accessory for the convenience of occupants of an environment where the accessory is located. For example, referring to FIG. 1, it may be desirable to operate thermostat 112 to warm (or cool) home environment 100 to a desired temperature in anticipation of the occupant returning. Or it may be desirable to make sure that TV 114 and light fixture 108 are both switched off when the occupant goes to bed.

While desirable, such automated control is complicated by the reality that most human beings do not adhere to a rigid schedule. Further, many environments have multiple occupants; for instance, a home may be occupied by parents and children, by a group of unrelated housemates, or the like. (The term "family" may be used herein to refer collectively to the occupants of a home, regardless of their particular legal or biological relationship or lack thereof.)

Accordingly, home automation and control can be enhanced based on knowledge of a user routine of various occupants. As used herein, a "user routine" (or just "routine") can refer generally to any pattern of behavior of an individual that can be inferred by an automated machine learning algorithm based on inputs indicative of the individual's location and/or activity at various times over an extended time span. In some embodiments, a user routine can be inferred by a mobile device that an individual habitually wears or carries (e.g., a smart phone or smart watch or the like), based on data automatically collected by the device.

Figure 5:
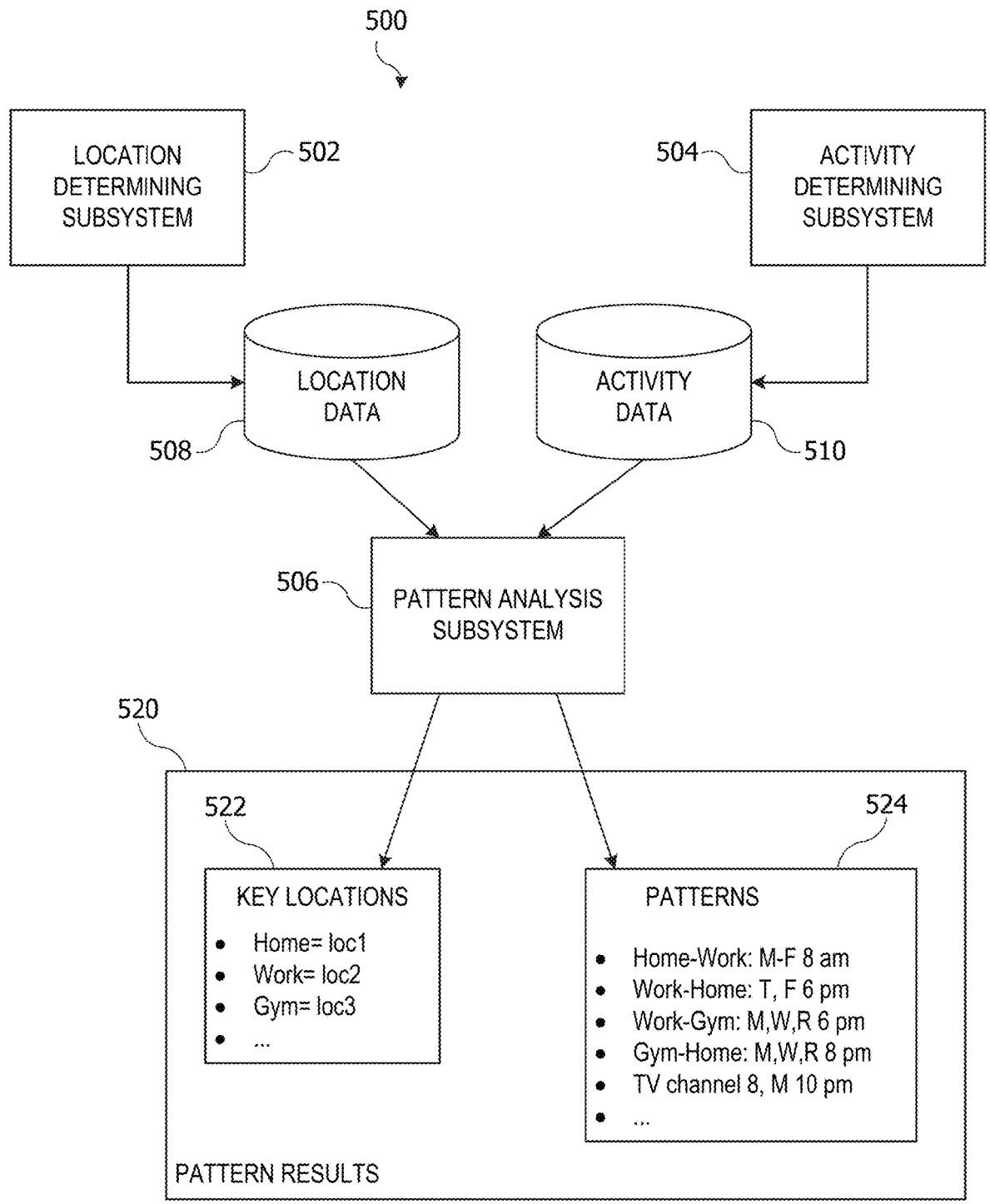
FIG. 5 is a simplified block diagram of a system for determining a user routine that can be used in connection with an embodiment of the present invention.

FIG. 5 is a simplified block diagram of a system 500 for inferring a user routine that can be used in connection with an embodiment of the present invention. System 500 can be implemented in a mobile device such as a smart phone or smart watch, and the same device can also implement a controller as described herein (e.g., controller 300 of FIG. 3, any of controllers 202 of FIG. 2, controller 102 of FIG. 1). System 500 can gather and analyze data pertaining to user location and activity across time and can analyze the data to detect patterns.

System 500 can include a location determining subsystem 502, an activity determining subsystem 504, and a pattern analysis subsystem 506. Location determining subsystem 502 can operate at various times to determine the current location of the device in which system 500 is implemented and can store the location information in location data store 508. For example, location determining subsystem 502 can incorporate a GPS receiver and can activate the GPS receiver from time to time to obtain a location fix (e.g., standard world coordinates representing the location of the device). The location fix, along with a time stamp indicating when the fix was obtained, can be stored in location data store 508. Location determining subsystem 502 can operate on a fixed schedule (e.g., recording location every few minutes) or opportunistically (e.g., recording location data whenever another process in the device requests current location information).

Activity determining subsystem 504 can operate at various times to determine a current activity in which the user is engaged and can store the activity information in activity data store 510. For example, activity determining subsystem 504 can incorporate accelerometers, gyroscopic motion sensors, or other inertial motion sensors that can detect whether and how the device is moving. In some embodiments, activity determining subsystem 504 can determine the user activity based on the motion (e.g., whether the user is running, walking, riding in a vehicle, stationary, or whether the device is at rest on a stable surface such as a tabletop). Like location determining subsystem 502, activity determining subsystem 504 can operate on a regular schedule or opportunistically as desired.

In some embodiments, activity determining subsystem 504 can also detect other status information pertaining to the device, such as whether the device is connected to a power source (e.g., a charger) or to a particular auxiliary device (e.g., an automobile head unit, a speaker dock, a specific computer system). This status information can also include information pertaining to user interactions with the device, such as launching a particular app (e.g., workout tracking app, telephony app, media app, remote control app to control accessories as described above) or changing device settings (e.g., enabling or disabling a "do not disturb" function, setting or canceling an alarm, etc.). In some embodiments, the status information can also include elements of the user's personal data that are accessible to the device in which system 500 is implemented, such as calendar data (e.g., scheduled appointments, meetings, and other events) maintained for the user. In general, any information indicative of what a user is doing that can be detected by the device can be included as activity data. Time-stamped activity data can be recorded in activity data store 510.

Through the ongoing operation of location determining subsystem 502 and activity determining subsystem 504, location data store 508 and activity data store 510 can accumulate a collection of location and activity records covering a span of time (e.g., six to eight weeks). The particular time span can be selected as desired, based on considerations such as storage space, the length of a time span needed to detect patterns of activity, and the desire to protect user privacy by not keeping records of user activity indefinitely, while keeping enough data to provide useful pattern results.

Pattern analysis subsystem 506 can periodically (e.g., once a day or once a week or the like) analyze the data accumulated in location data store 508 and activity data store 510 to detect various patterns that may be present. Examples of patterns can include going to particular locations repeatedly, going to a particular location at a similar time each day (e.g., commuting to and from work), using a particular device function while in a particular location (e.g., launching a workout app when at the gym), using a particular device function at a consistent time or in a consistent manner (e.g., setting alarm for 7:00 am, turning off the lights between 10 pm and 11 pm), or the like. Examples of pattern analysis and pattern detection are described in above-referenced U.S. patent application Ser. No. 14/081,895.

Pattern analysis subsystem 506 can output various pattern results 520. For example, pattern results 520 can include a set of "key location" identifiers 522. As used herein, a "key location" can be a location that the user visits regularly and spends significant time at. Examples can include the user's home, the user's place of work, a gym (or other workout space) the user frequents, and so on. In some embodiments, pattern analysis subsystem 506 can generate a list of key locations 522 without semantically labeling them. In other embodiments, pattern analysis subsystem 506 can assign semantic labels to some or all of key locations 522, e.g., based on activity information correlated with the location. For instance, a "home" location can be identified based on activity patterns such as where the device is when it is charged, where the device is left resting on a surface for long periods of time (suggesting that the user is asleep), where the device is when a daily alarm goes off, etc. A "work" location can be identified based on where the user goes most regularly that is not the home location and/or on activity the user does there (e.g., accessing productivity apps). Other locations, such as a gym, store, or the like can also be identified based on activity information (e.g., a "gym" can be any place where a user regularly performs workout activities such as running, cycling, or weightlifting).

Another example of pattern results can be pattern identifiers 524. Pattern identifiers 524 can include transitions between key locations that occur with reasonable regularity, such as the user going from home to work (or vice versa) or from work to the gym (if the user regularly goes to a gym after work). In some embodiments, pattern identifiers 524 can also include patterns of interactions with accessories in a particular location, provided that the device in which system 500 is included can detect the interaction. For instance, upon coming home, the user may operate a remote control app on his or her mobile phone to turn on the TV or select a particular program to watch, and such interactions can be detected and recorded by activity determining subsystem 504.

In some embodiments, pattern results are periodically generated or updated (e.g., on a daily or weekly basis), and previous results can be used to inform the generation of new pattern results. In such cases, it may be useful to retain "old" pattern results for a period of time. This period of time can be limited (e.g., to four months, eight months, etc.), in the interest of protecting user privacy.

It will be appreciated that system 500 is illustrative and that variations and modifications are possible. Determination of a user routine can be implemented in any manner desired, and further examples can be found in above-referenced U.S. patent application Ser. No. 14/081,895. In the interest of protecting user privacy, it may be desirable for system 500 to be implemented entirely within a single device (e.g., the user's mobile phone), such that the location data, activity data, and/or pattern results are not shared with other devices. In addition, it may be desirable to discard location data, activity data, and/or pattern results after a period of time (e.g., several weeks). In some embodiments, some or all of pattern results 520 (including key location identifiers 522 and/or pattern identifiers 524) can be selectively made available to trusted applications on the device in which system 500 is implemented and/or to other trusted devices, e.g., as described below; the raw location data and/or activity data from which pattern results were derived need not be shared.

V. Providing Feedback Based on User Routine(S)

Figure 6:
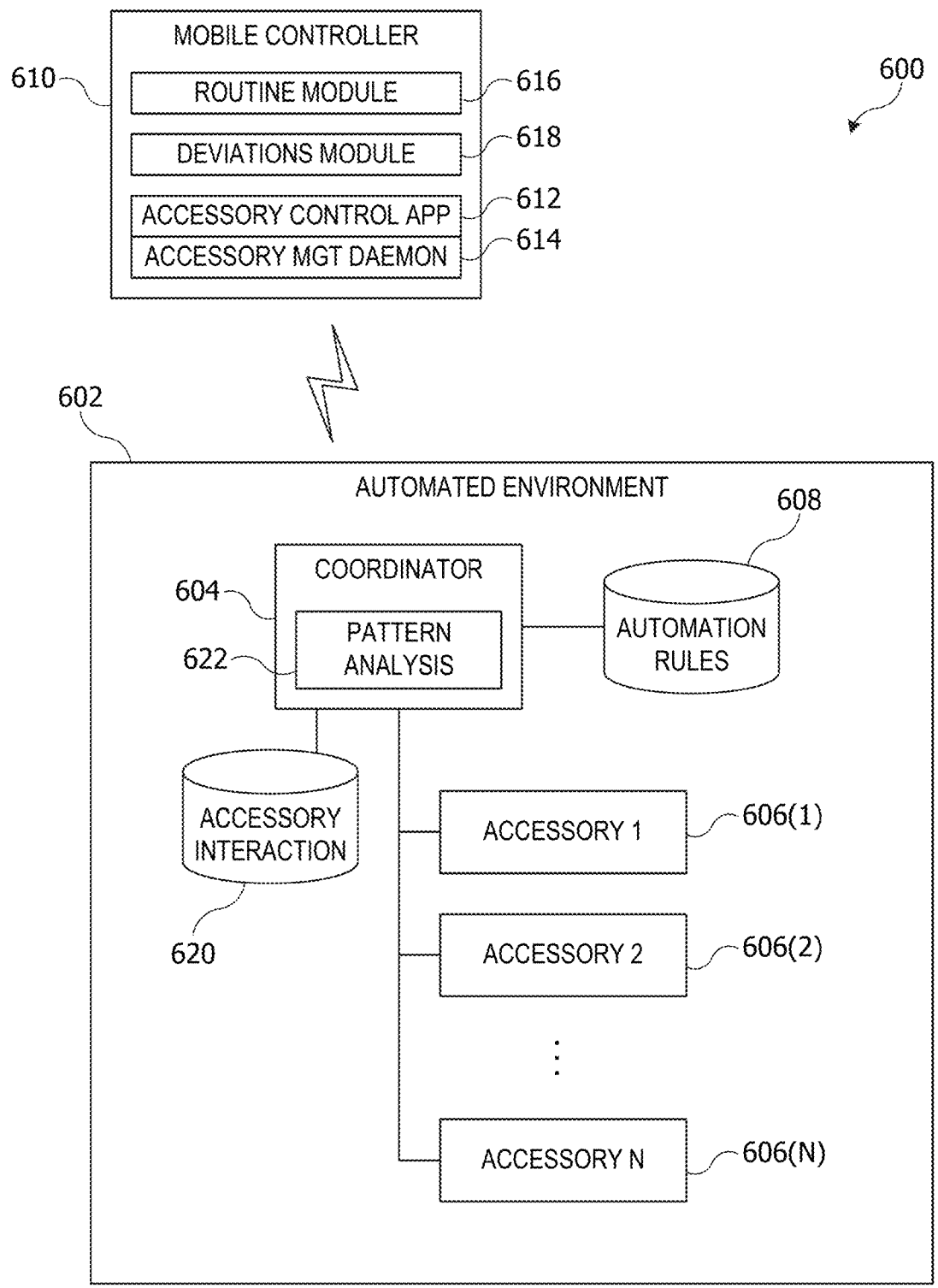
FIG. 6 is a simplified block diagram of a system according to an embodiment of the present invention.

In some embodiments of the present invention, an automated environment can provide feedback to its user(s) based on established user routine(s). FIG. 6 is a simplified block diagram of a system 600 according to an embodiment of the present invention. System 600 can include an automated environment 602. Automated environment 602 can include a coordinator 604, which can be similar to coordinator 210 of FIG. 2, and various accessories 606(1)-606(N) with which coordinator 604 can communicate. (N can be any integer.) As described above, accessories 606 can include various objects or things in an environment that can be electronically controlled, such as any of accessories 104-122 of FIG. 1. Accessories 606 can operate similarly to accessories 204 of FIG. 2.

In this example, coordinator 604 can maintain a store of automation rules 608. As used herein, an automation rule can specify an action to be taken by one or more of accessories 606 and a triggering condition under which the action is to be taken. The action can be any action that can be performed by a specific accessory 606, and the rule can specify which accessory (or accessories) 606 is to act. The triggering condition can be any condition that is detectable by coordinator 604 or by any of accessories 606. For example, an automation rule can specify that a porch light (an accessory) is to be turned on if an outside ambient light sensor (which can be a separate accessory or a component of the porch light accessory) detects a light level below a threshold, or at a specific time each night (e.g., 6:30 pm), or at a time determined based on information available to coordinator 604 (e.g., sunset, where coordinator 604 can determine the time of sunset by accessing weather data via the Internet or the like). As another example, an action can include turning on a heating (or cooling) system to adjust the temperature of the house to a target temperature, or changing the target temperature for the heating (or cooling) system. The triggering condition for a temperature change can be, for example, a specific time (e.g., shortly before the time the user normally arrives at home) or a specific event (e.g., when the user actually arrives home).

Automation rules 608 can be established in any manner desired. For example, a user can establish an automation rule by direct input (e.g., entering explicit instructions specifying a triggering condition and the action to be taken in response to that condition). In some embodiments, coordinator 604 or other components of system 600 can learn the user's behavior and define suggested automation rules, e.g., as described below. Coordinator 604 or other components of system 600 can present a suggested automation rule to the user, and the user can accept or decline the suggestion. Other techniques for establishing automation rules 608 can also be used.

While in the example shown, coordinator 604 maintains all automation rules 608, other implementations are possible. For instance, an accessory 606 can maintain its own automation rule(s), provided that the accessory is capable of detecting the triggering condition and initiating the corresponding action.

A mobile controller device 610 can communicate with automated environment 602. Mobile controller device 610 can be, for example, a mobile phone, wearable device, or other electronic device that a user may habitually wear or carry while going about daily activities. Similarly to controllers 202 described above, mobile controller device 610 can implement an accessory control app 612 and an accessory management daemon 614. These processes can allow mobile controller device 610 to communicate with components of automated environment 602 regardless of whether mobile controller device 610 is in physical proximity to the various devices of automated environment 602.

Mobile controller device 610 can include a routine module 616 (e.g., implementing system 500 described above) that can determine an established user routine (including, e.g., pattern results 520). Mobile controller device 610 can also include a deviations module 618, which can analyze real-time data provided by location determining subsystem 502 and/or activity determining subsystem 504 and can compare the real-time location and/or activity data to pattern results 520 to determine whether the user's current location and/or activity is consistent or inconsistent with the established user routine. As used herein, a "deviation" can refer to any instance where the user's current location and/or activity is inconsistent with an established user routine. For instance, the established user routine can be used to predict a current location and/or activity, and this prediction can be compared with the real-time data. Examples of specific logic and processes for detecting deviations from an established user routine are described in above-referenced U.S. patent application Ser. No. 14/081,895.

In operation, a user can interact with accessories 606, e.g., using mobile controller device 610. Routine module 616 can collect and store accessory interaction data, e.g., using activity determining subsystem 504 of FIG. 5; the accessory interaction data can be collected and stored in addition to or instead of other types of activity data. The accessory interaction data can include, e.g., which accessory 606 the user interacted with, what (if any) accessory operations the user invoked, information about where accessory 606 is located within automated environment 602, and time of the interaction. In some embodiments, the accessory interaction data can be time-correlated with location data gathered by location determining subsystem 502 of FIG. 5, and/or other activity data. In some embodiments, accessory interaction data is gathered only while mobile controller device 610 is in a key location, such as within automated environment 602.

In some embodiments, in addition to or instead of using mobile controller device 610 to gather accessory interaction data, coordinator 604 can gather accessory interaction data into accessory interaction data store 620. For example, in embodiment where controllers (e.g., mobile controller device 610) communicate with accessories 606 indirectly via coordinator 604, coordinator 604 can log information about some or all of the accessory-interaction messages received from or sent to various controllers. The log entry can include: an identifier of the controller (or of a user of the controller); location information for the controller when the message was sent (e.g., whether the controller communicates via a local network, indicating that the controller is within automated environment 602, or a wide-area network, indicating that the controller is not within automated environment 602); a record of which accessory 606 was interacted with; a record of message(s) sent by the controller to the accessory (and vice versa); the time of the interaction; and so on. In some embodiments, such as where controllers can communicate directly with accessories 606, accessories 606 can report their interactions with various controllers to coordinator 604, and coordinator 604 can log accessory interaction data based on accessory reports in addition to or instead of relying on communications from a controller. Further, if a user operates one of accessories 606 manually (e.g., by flipping a physical light switch instead of using a controller to change the power state), accessory 606 can report to coordinator 604 that it was operated manually. Depending on implementation, it might or might not be possible to determine which user performed a manual operation. For instance, if automated environment 602 includes sensors, it may be possible to determine which user was in proximity to coordinator 604 at the time of the operation.

Coordinator 604 can aggregate accessory interaction data across multiple controllers operated by multiple users as well as across multiple accessories in automated environment 602, and accessory interaction data records can be retained in accessory interaction data store 620 for a desired period of time (e.g., six to eight weeks). It should be noted that accessory interaction data store 620 can be local to coordinator 604, and it is not necessary to share accessory interaction data records with any other device inside or outside of automated environment 602.

In some embodiments, coordinator 604 can include its own pattern analysis module 622, which can implement algorithms similar to pattern analysis subsystem 506 of FIG. 5. Pattern analysis module 622 can operate on accumulated accessory interaction data in accessory interaction data store 620 and can detect patterns, e.g., in the form of correlations such that if a first set of events or conditions occurs, then a second set of events or conditions is likely to occur as well. Patterns can be specific to a particular user (or controller) or aggregated across all controllers in automated environment 602.

In some embodiments, mobile controller device 610 can also contribute data other than accessory interaction data to coordinator 604. For example, mobile controller device 610 can determine a time period when the user of mobile controller device 610 is likely sleeping (e.g., based on various indicia such as mobile controller device 610 being connected to a charger, mobile controller device 610 being at rest on a surface with no user interaction for an extended period, operation of a "do not disturb" function, physiological measurements of the user such as pulse or respiration rates, or the like), and mobile controller device 610 can provide this information, as well as other information about the user's patterns.

Coordinator 604 can detect a variety of patterns, such as the most likely time for users to operate a particular accessory; the most likely interactions for users to perform with a particular accessory; time periods when all users (or particular users) of automated environment 602 are likely to be present; time periods when all users (or particular users) of automated environment 602 are likely to be absent; time periods when various users sleep; and so on. To the extent that coordinator 604 has information about where accessories are located within automated environment 602 (e.g., which accessories are located in particular rooms or zones as described in above-referenced U.S. patent application Ser. Nos. 14/725,891 and 14/725,912), coordinator 604 can also determine patterns of occupancy of various rooms or other specific locations within automated environment 602. In some embodiments, coordinator 604 can identify specific groups of accessories as being physically or logically related, e.g., based on patterns of a user interacting with the accessories in the group at proximate times or in a particular sequence. For instance, a user might regularly turn on the TV and shortly thereafter turn off or adjust a light in the room in order to see the screen better, and coordinator 604 can detect the correlation between these operations and infer a relationship. As another example, a user in the kitchen may interact with various accessories located in the kitchen (e.g., kitchen lights, stove controls, refrigerator, and dishwasher) at around the same time, which can lead to an inference that these accessories are related.

Based on detected patterns that relate to accessory interactions, coordinator 604 or mobile controller device 610 can provide feedback to users of automated environment 602. For example, instances in which a user forgets to take a habitual action can be detected, based on a detected pattern in which the user typically takes specific sets of actions together. For instance, a user may habitually close the garage door when leaving the environment, or turn off all lights when going to bed. These habits can be detected as patterns of correlated actions or events (e.g., a "close the garage door" accessory interaction typically takes place at about the time the user leaves the environment, or a "turn off lights" accessory interaction correlates with the time the user habitually goes to bed). Once a pattern (or routine) of correlated actions has been detected, deviations from the pattern can also be detected. For instance, if the user takes one of the correlated actions (e.g., leaving) but not the other (e.g., closing the garage door), coordinator 604 or mobile controller device 610 can identify the absence of the other action as being a deviation from an established pattern. Based on this identification, coordinator 604 or mobile controller device 610 can prompt the user to take the omitted action. For instance coordinator 604 can detect that the garage door remains open after the user has left and can prompt the user to change this, e.g., by communicating with mobile controller device 610. The user can respond to the prompt.

Another type of feedback can include recommending changes to established patterns. For example, a user may come home and turn on all the lights, even in rooms that are not occupied. Coordinator 604 or mobile controller device 610 can detect this pattern and identify it as energy-inefficient. Accordingly, coordinator 604 or mobile controller device 610 can present a message to the user suggesting a change in behavior.

Still another type of feedback can include suggesting automations that can be implemented. For example, a pattern can be detected that when the user comes home, he turns on the TV to a particular channel and also turns on the lights in the kitchen. Coordinator 604 or mobile controller device 610 can detect this pattern and suggest an automation rule to implement these actions automatically when the user comes home. If the user accepts the suggestion, the new automation rule can be added to automation rules data store 608.

Figure 7:
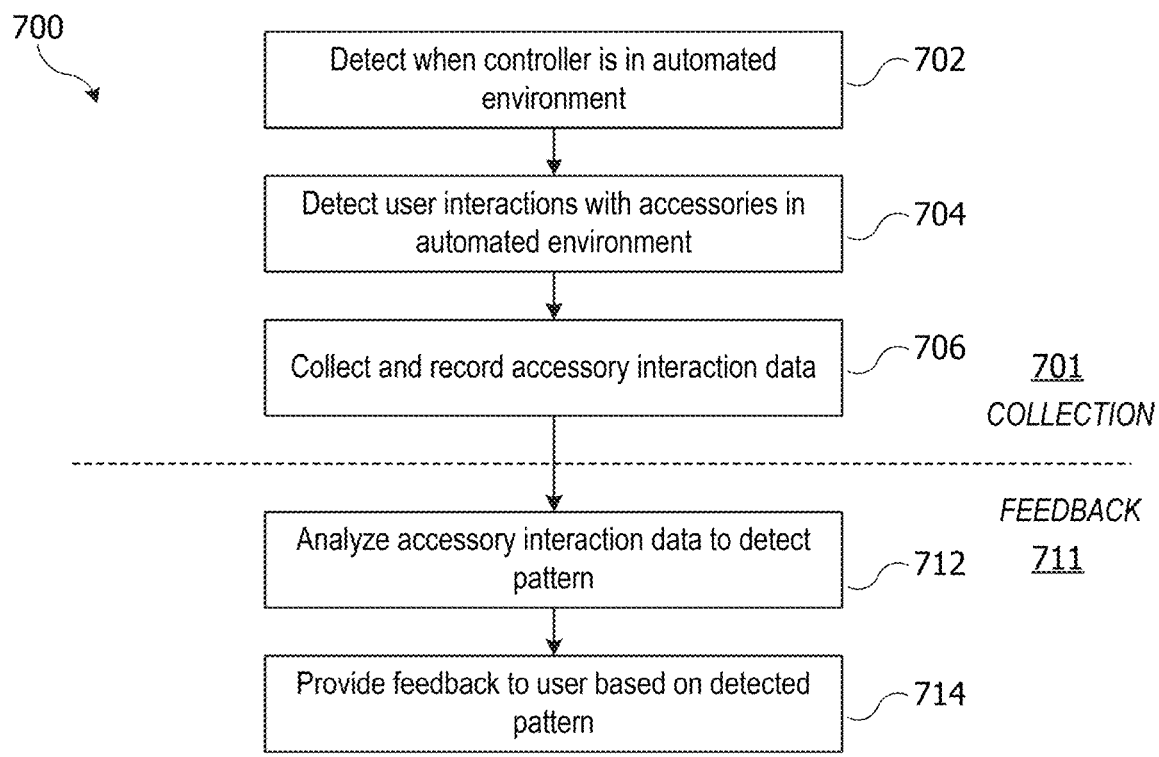
FIG. 7 is a flow diagram of a process according to an embodiment of the present invention.

In some embodiments, detection of patterns and providing feedback can be performed by a controller such as mobile controller device 610. FIG. 7 is a flow diagram of a process 700 according to an embodiment of the present invention. Process 700 can be implemented, e.g., in mobile controller device 610 or in other controllers as desired. As shown, process 700 can include a collection phase 701 and a feedback phase 711.

Collection phase 701 can be performed whenever mobile controller device 610 interacts with any of accessories 606. At block 702, process 700 can detect when mobile controller device 610 is in (or in some embodiments remotely interacting with) an automated environment, e.g., automated environment 602.

At block 704, process 700 can detect user interactions with one or more accessories in the automated environment. For instance, process 700 can be notified when accessory management daemon 614 sends a message to an accessory 606 or receives a message from accessory 606. The notification can include details such as which accessory 606 was communicated with and which messages were sent and/or received. Thus, the user interactions can be interactions of the controller with the one or more accessories. A plurality of interactions can be detected with the one or more accessories.

At block 706, process 700 can collect and record accessory interaction data related to the detected interaction. The accessory interaction data can include information about messages occurring as part of the detection interaction, e.g.: an identifier of the accessory; an identifier of the automated environment where the accessory is located (since a mobile controller may be capable of interacting with multiple different automated environments); location information for the mobile controller device (e.g., whether it is physically within or outside of the automated environment at the time of the interaction, or more detailed location information); a record of particular messages sent and/or received during the interaction; and other information as desired. In some embodiments, accessory 606 or coordinator 604 can provide other state information pertaining to the state of automated environment 602 (e.g., whether anyone else is present in the environment, local time, local weather conditions, or any other data that may be available).

Feedback phase 711 can be performed periodically (e.g., once per day, once per week) on the set of all collected accessory interaction data. At block 712, process 700 can analyze the collected accessory interaction data to detect patterns that may be present. In some embodiments, a pattern can include any correlation between or among two or more types of accessory interaction or between an accessory interaction and some other item of information about the state of mobile controller device 610 and or automated environment 602. Frequency analysis and other techniques described above with reference to FIG. 5 can be used. Any type of pattern can be detected; specific examples are described below.

At block 714, process 700 can provide feedback to a user based on a detected pattern. The feedback can include, for example, a suggestion to take an action the user may have forgotten, a recommendation to change a behavior pattern, a suggestion to automate a habitual action or set of actions, or the like. Specific examples are described below.

Figure 8:
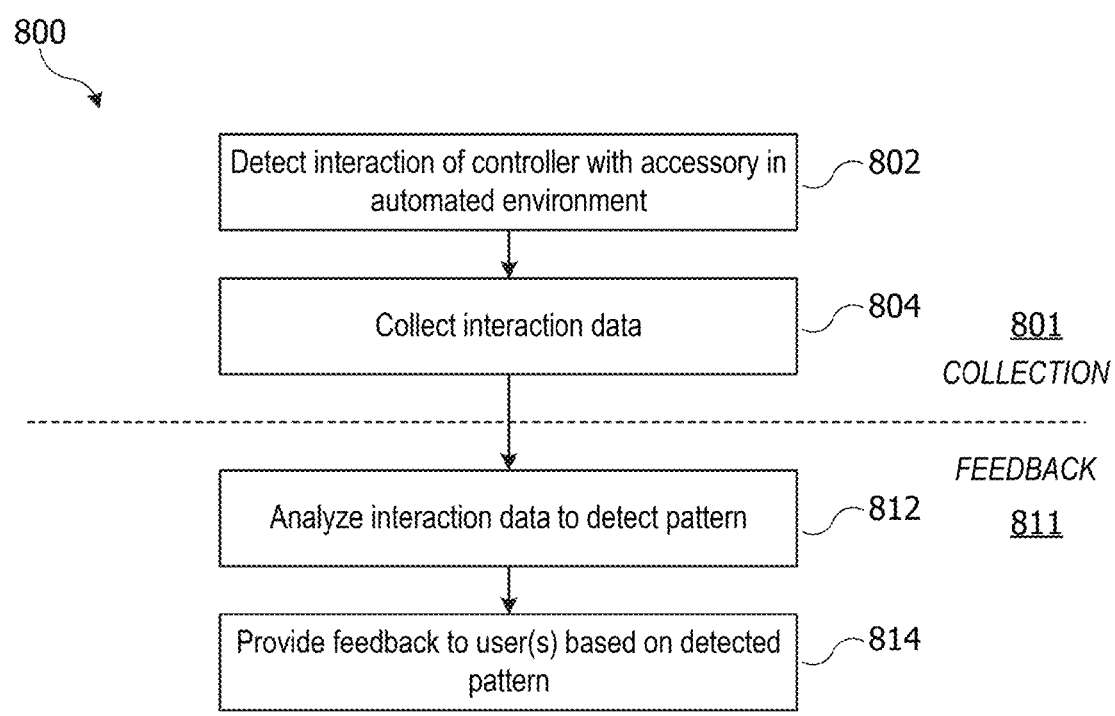
FIG. 8 is a flow diagram of a process according to an embodiment of the present invention.

In some embodiments, detection of patterns and providing feedback can be performed by a coordinator such as coordinator 604. FIG. 8 is a flow diagram of a process 800 according to an embodiment of the present invention. Process 800 can be implemented, e.g., in coordinator 604. As shown, process 800 can include a collection phase 801 and a feedback phase 811.

Collection phase 801 can be performed whenever coordinator 604 interacts with a controller such as mobile controller device 610 or with an accessory such as any of accessories 606. At block 802, process 800 can detect an interaction between mobile controller device 610 and one of accessories 606 in automated environment 602. For example, where coordinator 604 can act as an intermediary between mobile controller device 610 (or another controller) and accessories 606, coordinator 604 would participate in the interaction and therefore be able to detect it. For interactions where coordinator 604 does not act as an intermediary, accessories 606 can be configured to notify coordinator 604 of messages received from and/or sent to any controller. The notification can include details such as which controller was communicated with, which messages were sent and/or received, and so on.

At block 804, process 800 can collect and record accessory interaction data related to the detected interaction. The accessory interaction data can include information about messages occurring as part of the detection interaction, e.g.: an identifier of the accessory; location information for the mobile controller device (e.g., whether it is physically within or outside of the automated environment at the time of the interaction, or more detailed location information); a record of particular messages sent and/or received during the interaction; a time at which the interaction occurred; etc. In some embodiments, accessories 606 can provide, or coordinator 604 can infer, other state information pertaining to the state of automated environment 602 (e.g., whether anyone is present in the environment, local time, local weather conditions, or any other data that may be available).

Feedback phase 811 can be performed periodically (e.g., once per day, once per week) on the set of all collected accessory interaction data. At block 812, process 800 can analyze the collected accessory interaction data to detect patterns that may be present. As with process 700, a pattern can include any correlation between or among two or more types of accessory interaction or between an accessory interaction and some other item of information about the state of mobile controller device 610 and/or automated environment 602. Other patterns can include patterns involving two or more controllers interacting with the same accessory, patterns involving different mobile controllers (and their associated users) entering and/or leaving automated environment 602, and so on. Frequency analysis and other techniques described above with reference to FIG. 5 can be used. Any type of pattern can be detected; specific examples are described below.

At block 814, process 800 can provide feedback to a user based on a detected pattern. The feedback can include, for example, a suggestion to take an action the user may have forgotten, a recommendation to change a behavior pattern, a suggestion to automate a habitual action or set of actions, or the like. Specific examples are described below. Coordinator 604 can communicate the feedback to the user directly (e.g., using its own user interface) or via another device such as mobile controller device 610. For example, feedback generally applicable to the occupants of automated environment 602 can be presented at the user interface of coordinator 604 while feedback specific to a particular user can be presented via that user's mobile controller.

It will be appreciated that the systems and processes described herein are illustrative and that variations and modifications are possible. Process steps described as sequential may be executed in parallel, order of steps may be varied, and steps may be modified, combined, added or omitted. Automation rules can be stored on accessories, in a coordinator, and/or in a mobile controller device as desired. In some embodiments, both a mobile controller and a coordinator can perform data collection, pattern detection, and feedback generation, and operations can be combined across devices. For instance, a coordinator can collect information about detected patterns from multiple controllers and can analyze the patterns detected by different controllers to detect aggregate patterns across controllers.

To further illustrate feedback based on user routines, specific use-case examples will now be described. Any or all of these use-cases can be implemented in combination, and these examples are not intended to be exhaustive.

VI. Use Cases

A. Use-Case 1: Reminder to Turn off Lights at Bedtime

In some embodiments, a controller or coordinator can compare a detected pattern (based on past interactions) to current user behavior (based on a currently detected interaction or behavior) and can determine whether the user has deviated from the pattern. A deviation from the pattern can result in a reminder to the user.

For example, the user may have a pattern of turning off all the lights in the home before going to bed. A controller or coordinator can detect this pattern as a correlation between a set of accessory interactions with various light fixture accessories (more specifically, a set of instructions to those accessories to turn off the light) and a transition to a mobile controller state indicating that the user has gone to sleep. As described above, when the user is going to sleep can be inferred based on lack of use or motion of the user's mobile controller, the mobile controller being placed on or connected to a charger, the mobile controller being placed in a "do not disturb" state, physiological measurements of the user such as pulse and/or respiration (if the mobile controller has access to such measurements), and so on.

Once the correlation has been detected and identified as a pattern that occurs regularly (in this case, every night or most nights within the analyzed time range), the controller or coordinator can detect a deviation from the pattern should one occur. For instance, on a particular night, the mobile controller may determine that the user has gone to sleep while accessory interaction data (or current accessory state data) indicates that lights are still on. When this deviation from the pattern is detected, the mobile controller or coordinator can prompt the user to turn off the lights.

In some embodiments, the mobile controller or coordinator can incorporate various decision logic to determine when and how to prompt the user. For example, the user may have gone to sleep in a location outside the automated environment where the user normally sleeps. In this case, the user may not want to be prompted. As another example, other users in the automated environment may still be awake and active, and turning off lights might not be desirable while this is the case. A coordinator can determine whether other users are awake and active and can suppress a prompt to turn off the lights based on this information.

As another example, an automated environment can be home to multiple users (referred to herein as a family), and the order in which the users go to bed may vary, but the family has a policy that the last user to go to bed should turn off the lights. A coordinator can detect this pattern by detecting a correlation between the times when everyone has gone to bed and all lights being turned off. Once the pattern has been identified, the coordinator can detect a deviation, e.g., where lights remain on after all users have gone to bed. The coordinator can send feedback to the last user to go to bed, prompting that user to turn off the lights.

B. Use-Case 2: Reminder when Door Left Open

Another example of a pattern that can be detected includes users closing a door, such as a garage door. For example, in some neighborhoods it may be considered safe to leave a garage door open when occupants of a house are present but not safe when the house is empty. Accordingly, the user(s) who occupy an automated home environment may have a pattern of closing the garage door when they leave. The pattern can be that whenever a user leaves, he or she closes the garage door (if it is open), or that the last user to leave closes the garage door (if it is open).

A controller or coordinator can detect this pattern as a correlation between an accessory interaction (closing the garage door) and a controller leaving the automated environment. Once the correlation has been identified and detected as a pattern, the controller or coordinator can detect a deviation from the pattern should one occur. For instance, on a particular day, the mobile controllers may indicate that all the users have left the automated environment while accessory interaction data (or current accessory state data) indicates that the garage door is open. When this deviation is detected, the mobile controller or coordinator can prompt one or more of the users to close the door. For example, the coordinator can identify the last user to leave and can send a message to that user's mobile controller indicating that the garage door is not closed and the house is empty and asking whether the garage door should be closed. The user's mobile controller can present this message as a prompt to the user. Based on the user's response to the prompt, which can be relayed from the mobile controller to the coordinator, the coordinator can either close the garage door or leave it open.

C. Use-Case 3: Recommending Improvements in a Pattern

In some embodiments, a controller or coordinator can compare a detected pattern (based on past interactions) to a preferred pattern (which can be based on recommended practices for home management or management of another environment). If the detected pattern differs from the preferred pattern, the controller or coordinator can suggest changes the users can make in the detected pattern that would bring the pattern into closer conformity to the preferred pattern.

For example, a user (or family) may have a pattern of turning on lights when entering a room (or the home) but not turning off the lights when leaving the room (or the home). A recommended practice for home management can be to turn off lights when the room (or home) is unoccupied, as turning off unneeded lights generally conserves electricity, extends the lifespan of light bulbs in the home, and saves money. A controller or coordinator that is programmed to know that the recommended practice is to turn off the lights can detect that one or more of the users are habitually not turning off the lights and can generate reminders to those users to help them develop better habits. For instance, when a particular user who has the habit of not turning off the lights is detected leaving a room (or the home), the user's controller (or a coordinator) can determine whether the lights in the room are still on, and if so, the user's controller can present a prompt to remind the user to turn off the lights.

As another example, a user may habitually run a dishwasher (or other appliance) during "peak" hours for electricity consumption (e.g., from 11:00 am to 7:00 pm). This pattern can be detected based on a correlation between time of day and when the dishwasher runs. A recommended practice for home management can be to shift electricity consumption away from peak hours where possible, as this can reduce strain on the power grid. In some areas, electricity providers may offer differential rates based on time of day when power is consumed, so shifting electricity consumption to off-peak hours where feasible may also be in the user's financial interest. A controller or coordinator that is programmed to know that the recommended practice is to shift electricity use away from peak hours can detect that the user is habitually running the dishwasher during peak hours and can present a suggestion to the user to change the habit. In some embodiments, the suggestion can include motivational content (e.g., informing the user that rates are lower during off-peak hours). In addition to the suggestion, if the user operates a controller to instruct the dishwasher to start during peak hours, the controller can generate a reminder to the user that the selected start time is during peak hours and can suggest an alternative start time.

D. Use-Case 4: Proposing Automation Rules

Referring to use-case 1, examples were described in which a controller or coordinator can detect a pattern in which a user turns off all lights before going to bed, or a pattern in which the last user in a household to go to bed turns off the lights before going to bed. As described in use-case 1, a controller or coordinator can prompt the user when the user forgets.

Additionally or instead, a controller or coordinator can prompt the user to automate this behavior (which can alleviate the need for the user to be reminded). For example, having detected the pattern of the last user to go to bed turning off the lights, the controller or coordinator can generate a prompt offering to automate the activity. The prompt can be, for example, an audio or visual prompt presenting the message "Would you like me to turn off the lights after everyone goes to bed?" A user who receives the prompt can accept or decline the offer, e.g., by saying "Yes" or "No" in a voice interface, by touching or otherwise operating a control element of a graphical interface, or the like. If the offer is accepted, the controller or coordinator can add an automated rule to the set of automated rules for the automated environment. The triggering condition can be "when all users have gone to bed," and the resulting action can be "turn off any lights that are on." Occurrence of the triggering condition can be detected based on reports from the users' mobile controllers (e.g., as described above), and the action can be implemented by sending control messages to accessories that are light fixtures.

In a similar manner, referring to use-case 2, examples were described in which a controller or coordinator can detect a pattern in which the garage door is closed when users leave and can remind a user when the user leaves without closing the garage door. Additionally or instead, a controller or coordinator can prompt the user to automate this behavior, similarly to the lights-off example described above.

As yet another example, a user may habitually watch a particular TV show at a particular time. A controller or coordinator can detect this pattern (e.g., watching channel 8 from 7:00 to 8:00 pm on Mondays). Once the pattern is detected, the controller or coordinator can suggest automating the behavior. For example, the controller or coordinator can suggest automatically turning on the TV to channel 8 at 7:00 pm every Monday. Alternatively, the controller or coordinator can offer to set the TV or a video recorder to record the program, to make sure the user doesn't miss it. In some embodiments, having detected the recurring pattern, the controller or coordinator can predict likely deviations (e.g., if the user has a meeting scheduled for a particular Monday evening) and can offer to set the TV or video recorder to record the program on the evening when the user would otherwise miss it.

Other patterns that can be detected include patterns correlated with the user arriving at or leaving the home environment. For instance upon arriving at home, the user may habitually set the thermostat to a preferred temperature, turn on the lights in a room, and start playing music in that room. A controller or coordinator can detect this pattern and can offer to automatically take these actions for the user when the user arrives at home. If the user accepts the offer, automated rules can be created to implement the actions, with the triggering condition being the user arriving at home. In some embodiments, the triggering condition can be something other than the user's actual arrival, such as the user's habitual arrival time or the user leaving work to come home (which can be determined by the user's mobile controller, e.g., using a routine-inferring subsystem as described above).

E. Other Examples of Feedback

The examples of feedback given above are intended to be illustrative and not limiting. The patterns detected and feedback given can vary as to complexity and consequence. For example, in some embodiments, a controller or coordinator may be able to determine that the users in an automated home environment include a parent and a child. The child may go to bed at a specific time each day (e.g., 8:30 pm), and the parent may have a habit of spending time in the child's room at around that time, e.g., to read to the child. Depending on what information is available, a controller or coordinator may be capable of detecting that the parent and child routinely spend this time together. For example, the controller or coordinator may be able to determine that a mobile controller belonging to the parent is routinely located within a particular room or zone in the house (which might or might not be identified as the child's room) between the hours of 8:30 pm and 9:00 pm. As another example, if the child also has a controller that routinely spends the night in the child's room, either controller (or a coordinator) can detect that the parent's and child's controllers routinely spend a particular time period in proximity to each other. Once the pattern is detected, deviations can also be detected, and the parent can be reminded to go spend time with the child. Alternatively, the parent can be prompted to set a daily reminder or calendar appointment for the time to be spent with the child.

Still other examples will be apparent to those skilled in the art with access to the present disclosure.

VII. Further Embodiments

While the invention has been described with respect to specific embodiments, one skilled in the art will recognize that numerous modifications are possible. Controller networks and/or accessory networks can include as many or as few devices as desired. Use of a coordinator is not required; regardless of the number of accessories or number of controllers, it is always possible (at least in principle) to establish pairings between each controller and each accessory and to have all controllers operate by controlling accessories directly.

Further, where a coordinator is present, it can be but need not be the case that all controllers are permitted to access all accessories via the coordinator. For instance, some controllers might be restricted from accessing accessories when not within the local environment, and some accessories might require that controllers access them directly rather than through a coordinator.

In addition, while the foregoing description makes reference to a home as an example of an environment that can be automated, embodiments of the invention are not limited to the home environment. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc.

Similarly, some embodiments are described in connection with a single user or a single mobile controller device. It is to be understood that a home (or other automated environment) can have multiple occupants using multiple controller devices, and the techniques described herein can be applied with respect to any or all of the occupants (users) and controllers that may be associated with a given automated environment. In some examples described above, mobile controllers can provide user-specific data (e.g., pattern results) to a coordinator in the automated environment. In some embodiments, users can opt out of sharing data with the coordinator or select the amount of data to be shared. In the interest of protecting privacy, the coordinator can retain user-specific data locally (e.g., data need not be backed up to the cloud) and store the data securely (e.g., using encryption or the like). In addition, retention of received data can be limited such that only recent user-specific data or environment-level pattern data is stored. For example, the coordinator can be configured to store only the most recent user-specific data from a particular device and to discard environment-level pattern or routine data for a fixed length of time (e.g., four months, eight months, etc.).

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   receiving, by at least one computing device, interaction data from a plurality of accessory devices indicating state changes occurring at the plurality of accessory devices, wherein the at least one computing device is a portable device, and wherein the plurality of accessory devices are accessory devices within a single home environment;

based on the interaction data, identifying, by the at least one computing device, a pattern of accessory state changes for a group of accessory devices of the plurality of accessory devices;

determining, by the at least one computing device, that a state of the group of accessory devices should be changed together based on the pattern of accessory state changes for the group of accessory devices;

generating, by the at least one computing device, a suggestion that accessory states of the group of accessory devices are to be changed together; and presenting, on a display of the at least one computing device, the suggestion that the accessory states of the group of accessory devices are to be changed together.

2. The method according to claim 1, wherein the pattern of accessory state changes is identified based on accessory state changes of the group of accessory devices being temporally related.

3. The method according to claim 1, wherein the pattern is identified based on accessory state changes of the group of accessory devices being based on a user routine.

4. The method according to claim 1, wherein the suggestion that the accessory states of the group of accessory devices should be changed is generated in response to a triggering condition being met.

5. The method according to claim 4, wherein the triggering condition comprises a predetermined time of day or a predetermined user action.

6. The method according to claim 1, further comprising storing the suggestion as an automation rule.

7. The method according to claim 6, further comprising:
receiving a selection of the automation rule; and
changing the accessory states of the group of accessory devices from a first accessory state to a second accessory state in accordance with the automation rule.

8. The method according to claim 3, wherein the user routine comprises a pattern of behavior of one or more users of an automated environment, wherein the automated environment comprises the plurality of accessory devices.

9. The method according to claim 1, wherein the suggestion comprises a suggestion to automate habitual actions performed by a user with the group of accessory devices.

10. A mobile device comprising:
a processor;
a memory;
a computer readable medium coupled to the processor, the computer readable medium storing instructions executable by the processor for implementing a method comprising:
receiving, by at least one computing device, interaction data from a plurality of accessory devices indicating state changes occurring at the plurality of accessory devices, wherein the at least one computing device is a portable device, and wherein the plurality of accessory devices are accessory devices within a single home environment;
based on the interaction data, identifying, by the at least one computing device, a pattern of accessory state changes for a group of accessory devices of the plurality of accessory devices
determining, by the at least one computing device, that a state of the group of accessory devices should be changed together based on the pattern of accessory state changes for the group of accessory devices;
generating, by the at least one computing device, a suggestion that accessory states of the group of accessory devices are to be changed together; and
presenting, on a display of the at least one computing device, the suggestion that the accessory states of the group of accessory devices are to be changed together.

11. The mobile device according to claim 10, wherein the pattern of accessory state changes is identified based on accessory state changes of the group of accessory devices being temporally related.

12. The mobile device according to claim 10, wherein the pattern is identified based on accessory state changes of the group of accessory devices being based on a user routine.

13. The mobile device according to claim 10, wherein the suggestion that the accessory states of the group of accessory devices should be changed is generated in response to a triggering condition being met.

14. The mobile device according to claim 13, wherein the triggering condition comprises a predetermined time of day or a predetermined user action.

15. The mobile device according to claim 10, further comprising storing the suggestion as an automation rule.

16. A non-transitory computer readable medium including instructions configured to cause one or more processors to perform operations comprising:
receiving, by at least one computing device, interaction data from a plurality of accessory devices indicating state changes occurring at the plurality of accessory devices, wherein the at least one computing device is a portable device, and wherein the plurality of accessory devices are accessory devices within a single home environment;
based on the interaction data, identifying, by the at least one computing device, a pattern of accessory state changes for a group of accessory devices of the plurality of accessory devices
determining, by the at least one computing device, that a state of the group of accessory devices should be changed together based on the pattern of accessory state changes for the group of accessory devices;
generating, by the at least one computing device, a suggestion that accessory states of the group of accessory devices are to be changed together; and
presenting, on a display of the at least one computing device, the suggestion that the accessory states of the group of accessory devices are to be changed together.

17. The computer readable medium according to claim 16, wherein the pattern of accessory state changes is identified based on accessory state changes of the group of accessory devices being temporally related.

18. The computer readable medium according to claim 16, wherein the pattern is identified based on accessory state changes of the group of accessory devices being based on a user routine.

19. The method according to claim 1, further comprising receiving, by the at least one computing device, an input to change the suggested group of accessory devices in response to the suggestion that the accessory states of the group of accessory devices are to be changed together.

20. The method according to claim 19, further comprising, in response to the input that the accessory states of the group of accessory devices are to be changed together, instructing, by the at least one computing device, the group of accessory devices to change their accessory states at a same time.

* * * * *